Patented Nov. 25, 1930

1,782,706

UNITED STATES PATENT OFFICE

WILHELM BAUER, OF WIESDORF-ON-THE-RHINE, AND WILHELM NEELMEIER AND THEODOR NOCKEN, OF LEVERKUSEN-ON-THE-RHINE, GERMANY, ASSIGNORS TO GENERAL ANILINE WORKS, INC., OF NEW YORK, N. Y., A CORPORATION OF DELAWARE

NEW INDIGOID DYESTUFFS

No Drawing. Application filed May 9, 1927, Serial No. 190,132, and in Germany June 11, 1926.

The present invention relates to new indigoid dyestuffs of the general formula:—

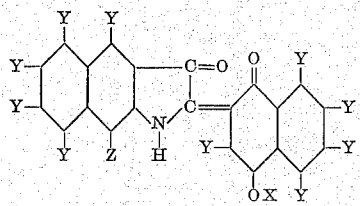

wherein X stands for an alkyl residue, Y for hydrogen or any other substituent and Z represents a halogen atom. These new dyestuffs may be prepared by causing a reactive α-derivative of a 2.3-naphthisatin substituted in the 1-position by halogen to be acted upon by a mono alkyl ether of the 1.4-dihydroxy-naphthalene or such a derivative thereof, which is not substituted in the ortho position to the hydroxyl group.

Our new dyestuffs are generally dark bluish-green crystalline powders, soluble with difficulty in cold concentrated sulfuric acid mostly with a green coloration, dyeing the textile fibre from a reddish-brown vat in fast green shades.

The following example illustrates our invention, the parts being by weight:—

(1) 310 parts of brominated-1-chloro-2.3-naphthisatin of the probable formula:

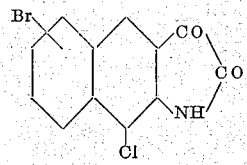

having a melting point of 313° C. and which is obtainable by treating 1-chloro-2.3-naphthisatin in nitrobenzene solution with one molecule of bromine as described in U. S. Patent No. 1,083,518, are converted into the α-chloride by heating with 240 parts of phosphorous pentachloride in 5000 parts of chlorobenzene. The resulting product is condensed with a solution of 200 parts of 4-methoxy-1-naphthol in chlorobenzene. The dyestuffs which possesses probably the formula:—

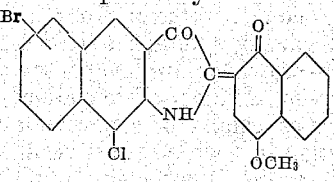

is filtered from the cooled reaction mixture, washed and dried. The new product is obtained in the form of a greenish blue crystalline powder, which is sparingly soluble in organic solvents in the cold, difficultly soluble in hot nitro-benzene, giving a bluish-green color and soluble in concentrated sulfuric acid with a green coloration. Hydrosulfite and caustic soda lye produce a reddish-brown colored vat from which textile fibres are dyed after oxidation in very pure yellowish-green shades of excellent fastness properties, especially of a particular fastness to chlorine.

When using instead of brominated-1-chloro-2.3-naphthisatin, the brominated 1-bromo-2.3-naphthisatin or the nitro product, which is easily obtainable by nitration of bromo-1-chloro-2.3-naphthisatin in concentrated sulfuric acid (small yellow needles melting above 280° C.) still yellower green shades result. Instead of 4-methoxy-1-naphthol other analogous ethers can be employed. By the application of 1-cholor-2.3-naphthisatin a somewhat bluer green is obtained.

We claim:—

1. As new products indigoid dyestuffs of the general formula:—

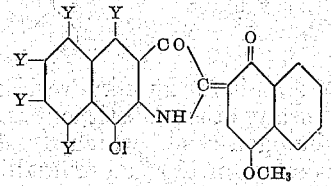

where Y stands for hydrogen or any other substituent, which dyestuffs are generally dark bluish-green crystalline powders soluble with difficulty in cold concentrated sulfuric acid with a green coloration, dyeing the textile fibre from a reddish-brown hydrosulfite vat fast green shades, and which may be obtained by condensing the 4-methoxy-1-naphthol with a reactive α-derivative of an 1-chloro-2.3-naphthisatin.

2. As a new product an indigoid dyestuff of the general formula:—

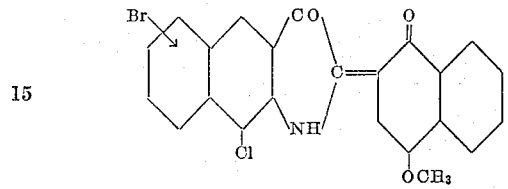

which is in a dry state a greenish-blue crystalline powder sparingly soluble in organic solvents in the cold, difficultly soluble in hot nitro-benzene giving a bluish-green color and soluble in concentrated sulfuric acid with a green coloration, dyeing the textile fibre from a reddish-brown colored vat very pure yellowish-green shades of excellent fastness properties especially of a particular fastness to chlorine, and which may be obtained by condensing the 4-methoxy-1-naphthol with brominated 1-chloro-2-3 naphthisatin α-chloride.

3. As new products, indigoid dyestuffs of the general formula:

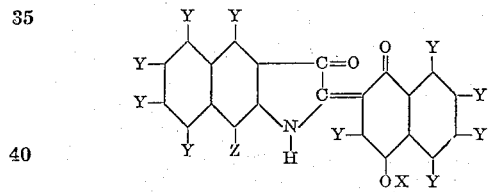

wherein X stands for an alkyl residue, Y for hydrogen or any other substituent and Z represents a halogen atom, which dyestuffs are generally dark bluish-green crystalline powders soluble with difficulty in cold concentrated sulfuric acid with a green coloration, dyeing the textile fibre from a reddish-brown hydrosulfite vat fast green shades.

4. As new products, the compounds of the general formula:

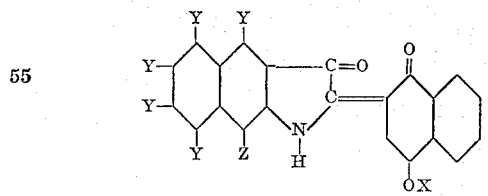

wherein X stands for an alkyl residue, Y for hydrogen or any other substituent and Z represents a halogen atom, which dyestuffs are generally dark bluish-green crystalline powders soluble with difficulty in cold concentrated sulfuric acid with a green coloration, dyeing the textile fibre from a reddish-brown hydrosulfite vat fast green shades.

In testimony whereof, we affix our signatures.

WILHELM BAUER.
WILHELM NEELMEIER.
THEODOR NOCKEN.